(12) United States Patent
Hsu

(10) Patent No.: US 7,447,532 B2
(45) Date of Patent: Nov. 4, 2008

(54) HANDHELD ELECTRONIC DEVICE WITH SHOCKPROOF MECHANISM

(75) Inventor: Hsien-Jung Hsu, Taipei (TW)

(73) Assignee: Inventec Corporation, Taipei (TW)

( * ) Notice: Subject to any disclaimer, the term of this patent is extended or adjusted under 35 U.S.C. 154(b) by 520 days.

(21) Appl. No.: 11/329,084

(22) Filed: Jan. 11, 2006

(65) Prior Publication Data
US 2007/0161420 A1 Jul. 12, 2007

(51) Int. Cl.
*H04M 1/00* (2006.01)
(52) U.S. Cl. .................... 455/575.8; 455/90.3
(58) Field of Classification Search ........... None
See application file for complete search history.

(56) References Cited
U.S. PATENT DOCUMENTS 5,613,237 A * 3/1997 Bent et al. ............. 455/351
6,731,913 B2 * 5/2004 Humphreys et al. ........ 455/90.3
7,236,588 B2 * 6/2007 Gartrell .................. 455/575.1

* cited by examiner

*Primary Examiner*—Thanh C Le
(74) *Attorney, Agent, or Firm*—Bacon & Thomas, PLLC

(57) ABSTRACT

The present invention is to provide a handheld electronic device comprising a phone body including an LCD display screen and a keypad disposed on a front surface thereof, and at least one first cutting surface formed at a corner between two adjacent side surfaces; and at least one padding block made of a shockproof material and each having a first joining surface being adapted to matingly fit onto the first cutting surface for securing the padding block to the corner of the phone body. By utilizing this, the padding block may collide with a hard object first when the handheld electronic device having the padding blocks falls thereto so as to lessen the effect or absorb the force of shocks and jarring and prevent the handheld electronic device from being damaged.

14 Claims, 2 Drawing Sheets

HANDHELD ELECTRONIC DEVICE WITH SHOCKPROOF MECHANISM

FIELD OF THE INVENTION

The present invention relates to handheld electronic devices and more particularly to a handheld electronic device (e.g., mobile phone) having a pad-based shockproof mechanism to prevent the electronic device from being damaged after hitting a hard object (e.g., falling to the ground).

BACKGROUND OF THE INVENTION

Conventionally, a mobile phone comprises control, audio, power, input, output, and wireless receiving circuits. The mobile phone is designed to enable both distant persons having a mobile phone to communicate each other. The circuits are enclosed in a housing as a whole so as to facilitate carrying the mobile phone and using same. The housing is typically made of plastic material and is formed by typical molding or injection molding. Thus, it is possible of mass producing mobile phone housing of high quality, low cost, and light-weight in a short time. Further, some types of mobile phone housing are made of alloy and are formed by manually polishing or lathe machining. Such mobile phone housings are robust, durable, and high quality.

However, whether made of plastics or alloy, mobile phone housing is subject to damage (e.g., breakage, peeling, or corner breakup) when the mobile phone collides with a hard object (e.g., falling to the ground). As a result, mobile phone appearance and structure may be adversely affected. A plastic enclosure adapted to fit around a typical mobile phone is thus invented by some manufacturers of the art. The enclosure serves as a protection for lessening the effect or absorbing the force of shocks and jarring when the mobile phone collides with a hard object. However, the plastic enclosure has disadvantages including being expensive, increasing weight and size of the mobile phone, and being inconvenient in carrying. Moreover, the plastic enclosure is adapted to closely wrap the mobile phone around. Thus, only one type of plastic enclosure conforms to a specific type of mobile phone. This in turn greatly increases the manufacturing cost. Moreover, it is very difficult of replacing a worn plastic enclosure by a mobile phone user. Thus, it is desirable to provide a handheld electronic device having a pad-based shockproof mechanism to prevent the handheld electronic device from being damaged after hitting a hard object (e.g., falling to the ground) in order to overcome the inadequacies of the prior art.

SUMMARY OF THE INVENTION

After considerable research and experimentation, a handheld electronic device with a shockproof mechanism according to the present invention has been devised so as to overcome the above drawbacks of the prior art.

It is an object of the present invention to provide a handheld electronic device comprising a phone body including at least one first cutting surface each formed at a corner between two adjacent surfaces of the phone body; and at least one padding block each having a first joining surface being adapted to matingly fit onto the first cutting surface for securing the padding block to the corner of the phone body. Each padding block is made of shockproof material. By utilizing this handheld electronic device having a shockproof mechanism, the padding block may first collide with a hard object when the handheld electronic device having the padding blocks falls thereto so as to lessen the effect or absorb the force of shocks and jarring. As such, the handheld electronic device is not subject to damage. As an end, the purpose of protecting the handheld electronic device is achieved.

In one aspect of the present invention each padding block may have different colors and designs such that a user of the handheld electronic device may change the colors and designs of the padding blocks as preferences in order to match to his or her clothes color and thus show his or her personal style.

The above and other objects, features and advantages of the present invention will become apparent from the following detailed description taken with the accompanying drawings.

DETAILED DESCRIPTION OF THE PREFERRED EMBODIMENTS

Figure 1:
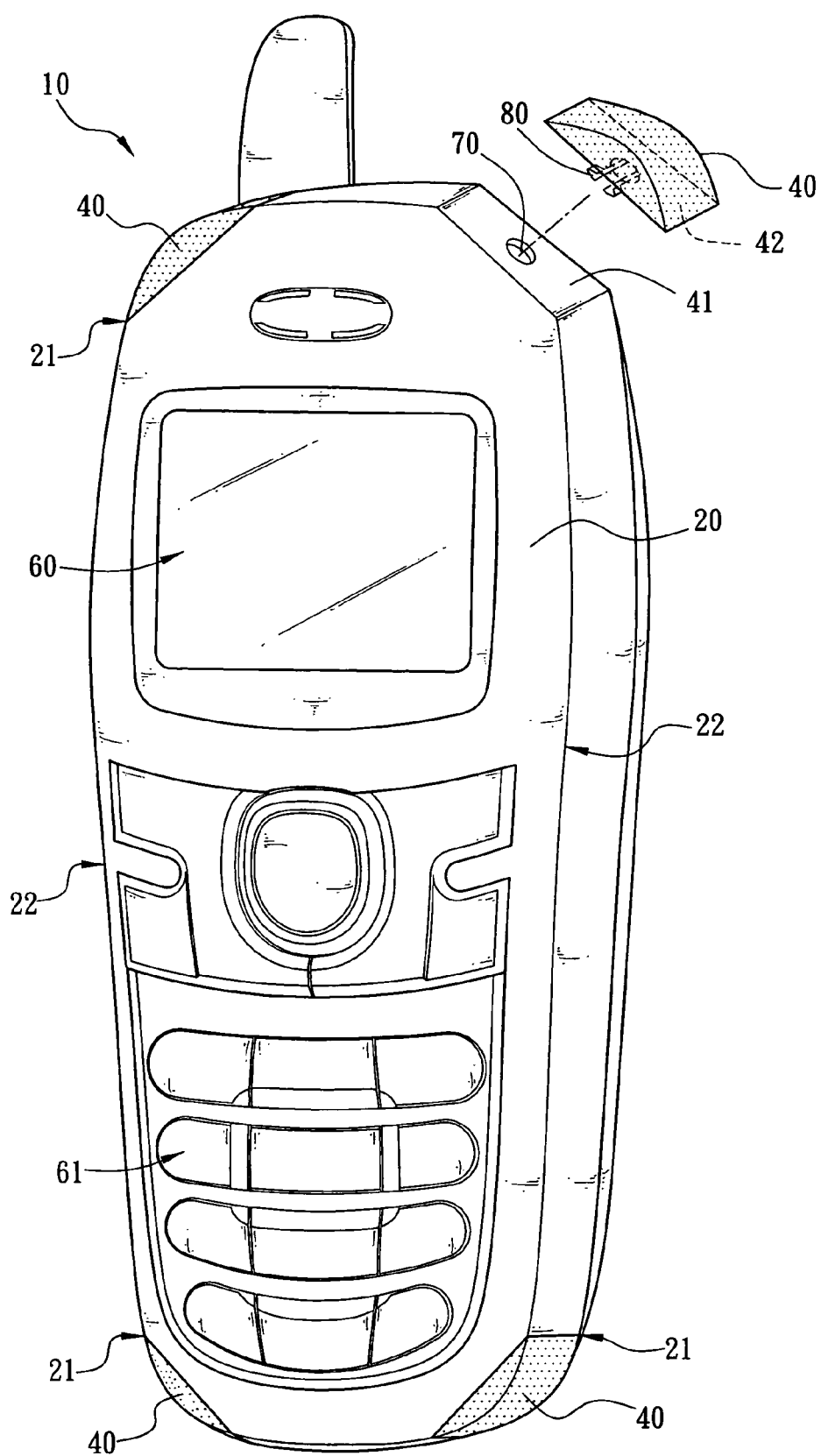
FIG. 1 is an exploded perspective view of a first preferred embodiment of handheld electronic device having a shockproof mechanism according to the invention.

In a first preferred embodiment of the invention, as referring to FIG. 1, a handheld electronic device (e.g., mobile phone) 10 in accordance with the invention comprises a phone body 20 and at least one padding block 40. The phone body 20 includes an LCD display screen 60 and a keypad 61 disposed on a front surface thereof, and at least one first cutting surface 41 formed at a corner 21 between two adjacent side surfaces. The padding block 40 has a first joining surface 42 being adapted to matingly fit onto the first cutting surface 41 for securing the padding block 40 to the corner 21 of the phone body 20. As such, the padding block 40 is formed integrally together with the phone body 20 as part of the corner 21 of the phone body 20. The phone body 20 of the handheld electronic device 10 further includes at least one side edge 22 for joining the front surface of the phone body 20 and either side surface thereof.

Figure 2:
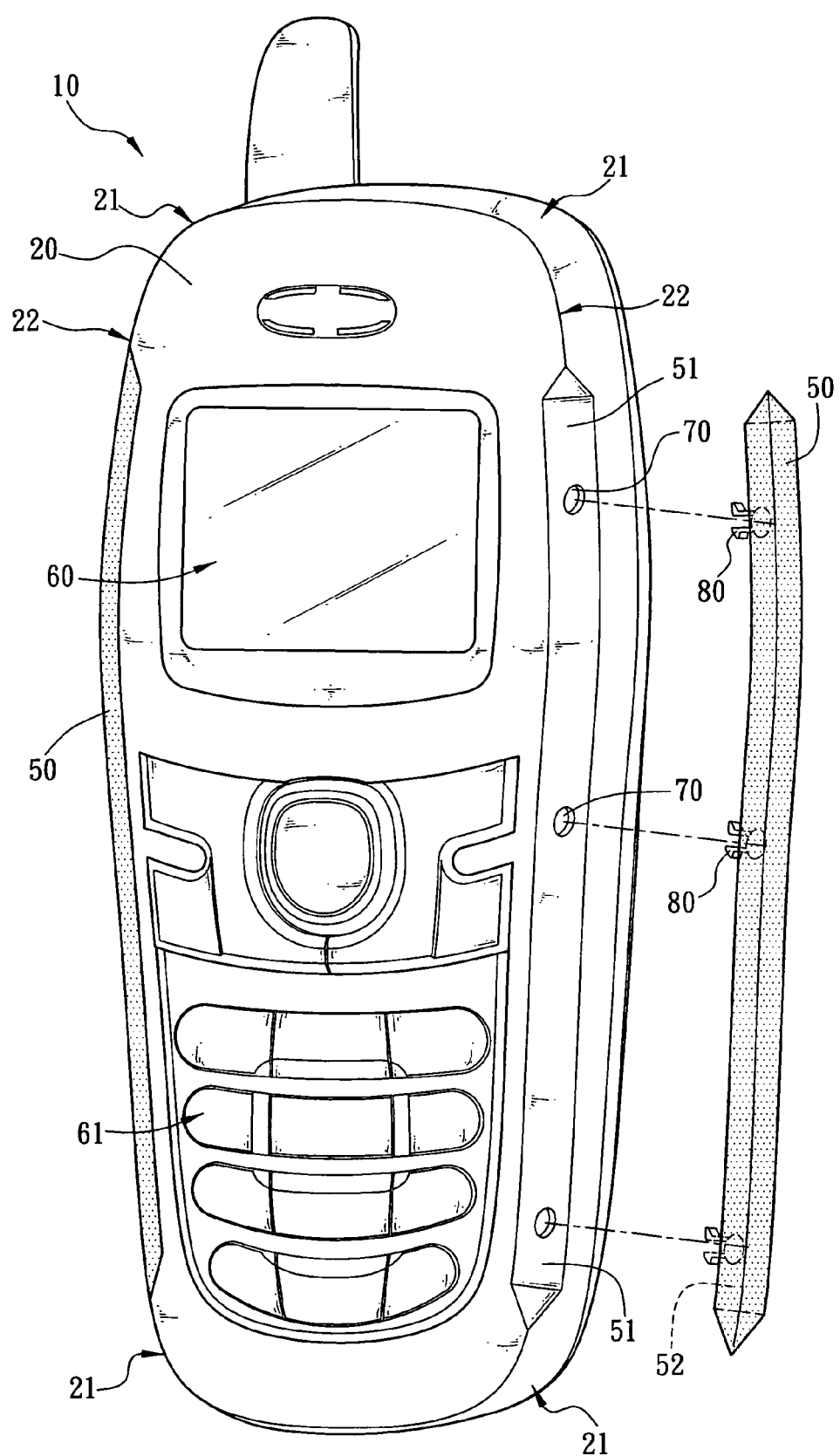
FIG. 2 is an exploded perspective view of a second preferred embodiment of handheld electronic device having a shockproof mechanism according to the invention.

In a second preferred embodiment of the invention, as referring to FIG. 2, the phone body 20 of the handheld electronic device 10 further includes at least one second cutting surface 51 formed at the side edge 22 joining the front surface of the phone body 20 and either side surface thereof. The second cutting surface 51 at the side edge 22 is formed as a recess of triangular section. At least one padding block 50 each is made of shockproof material for lessening the effect or absorbing the force of shocks and jarring, and comprises a second joining surface 52. The second joining surface 52 is adapted to matingly fit onto the second cutting surface 41, enabling the padding block 50 to be accommodated within the recess. As such, the padding block 50 is formed integrally together with the phone body 20 as part of the side edge 22 of the phone body 20.

It is understood that in most cases edges or corners of an object (e.g., side edges 22 or corners 21 of the handheld electronic device 10) collide with a hard object (e.g., the ground) when the object (e.g., the handheld electronic device 10) falls. It is thus envisioned by the invention that the padding block 40 or 50 may first collide with the hard object when the handheld electronic device 10 having the padding blocks 40 or 50 falls. Advantageously, the padding block 40 or 50 is adapted to lessen the effect or absorb the force of shocks and jarring when the handheld electronic device 10 falls to the ground. As such, the handheld electronic device 10 is not subject to damage. As an end, the purpose of protecting the handheld electronic device 10 is achieved.

Referring to FIGS. 1 and 2 again, the first joining surface 42 of the padding block 40 and the second joining surface 52 of the padding block 50 are adapted to fit onto the first cutting surface 41 and the second cutting surface 51 respectively. Each of the padding blocks 50 and 40 is shaped to attach to the corresponding the second and first cutting surface 51 and 41 respectively to integrally form together with the phone body 20 as part of the side edge 22 and the corner 21 of the phone body 20. As a result, the phone body 20 and the padding block 40 (or 50) form a whole housing. It is well understood by those skilled in the art that shapes of the padding blocks 40 and 50 are not limited to the above described ones. To the contrary, shapes of the padding blocks 40 and 50 may have other designs based on individual preferences so as to meet personal needs without departing from the scope and spirit of the invention.

Referring to FIGS. 1 and 2 again, in the invention the first cutting surface 41 is mated with the first joining surface 42 and the second cutting surface 51 is mated with the second joining surface 52 respectively. For example, each of the first cutting surface 41, the first joining surface 42, the second cutting surface 51, and the second joining surface 52 is a flat or an arcuate surface. Further, at least one hole 70 is formed on each of the first cutting surface 41 and the second cutting surface 51 or adhesive is formed thereon. Correspondingly, at least one latch 80 is formed on each of the first joining surface 42 and the second joining surface 52 or adhesive is formed thereon. It is possible of securely attaching the padding block 40 to the phone body 20 by engaging the adhesive of the first cutting surface 41 with that of the first joining surface 42 or securely attaching the padding block 50 to the phone body 20 by engaging the adhesive of the second cutting surface 51 with that of the second joining surface 52. Alternatively, it is possible of securely attaching the padding block 40 to the phone body 20 by inserting the latch 80 into the hole 70 or securely attaching the padding block 50 to the phone body 20 by inserting the latches 80 into the holes 70.

Referring to FIGS. 1 and 2 again, in a case of the first cutting surface 41 and the first joining surface 42 secured together by inserting the latch 80 into the hole 70 (or the second cutting surface 51 and the second joining surface 52 secured together by inserting the latches 80 into the holes 70), a user of handheld electronic device 10 may either remove the latch 80 from the hole 70 for detaching the padding block 40 from the phone body 20 or remove the latches 80 from the holes 70 for detaching the padding block 50 from the phone body 20. As an end, the purpose of replacing a worn padding block 40 or 50 is achieved.

Note that design of the padding block 40 or 50 of the invention may involve steps of falling the handheld electronic device 10 to the ground a predetermined plurality of times, recording times of each different portion of the handheld electronic device 10 hitting the ground, and determining the portion of the handheld electronic device 10 having the highest times to be the portion that the padding block 40 or 50 should be mounted thereon. Therefore, manufacturers of the art may know the highest shock absorbing effect of the handheld electronic device 10 will be obtained by providing the padding block 40 or 50 thereon.

In addition, the side edges 22 and the corners 21 are subject to wear or scrape when the handheld electronic device 10 is frequently used. Advantageously, the padding blocks 40 and 50 of the invention mounted on the cut corners 21 and the side edges 22 of the handheld electronic device 10 respectively may be replaced with new ones when it is worn. Alternatively, padding blocks 40 and 50 may have different colors as user preferences. Further, the colors of the padding block 40 or 50 may match clothes color such that the person may have a good feeling when carrying the handheld electronic device 10. Preferably, each of the padding blocks 40 and 50 is made of rubber, silicone rubber, or fabric so as to bring a degree of comfort to the hand holding the handheld electronic device. Further, such handheld electronic device is aesthetic. Furthermore, the padding blocks serve as shockproof means of the handheld electronic device.

While the invention herein disclosed has been described by means of specific embodiments, numerous modifications and variations could be made thereto by those skilled in the art without departing from the scope and spirit of the invention set forth in the claims.

What is claimed is:

1. A handheld electronic device with a shockproof mechanism to prevent the handheld electronic device from being damaged after hitting a hard object, the handheld electronic device comprising:

a phone body including an LCD display screen and a keypad disposed on a front surface thereof, and at least one first cutting surface formed at a corner between two adjacent side surfaces; and at least one padding block made of a shockproof material and each having a first joining surface being adapted to matingly fit onto the first cutting surface for securing the padding block to the corner of the phone body.

2. The handheld electronic device of claim 1, wherein each of the first cutting surface and the first joining surface is applied with adhesive thereon such that attaching the adhesive of the first cutting surface to that of the first joining surface will secure the first cutting surface and the first joining surface together.

3. The handheld electronic device of claim 2, wherein the first cutting surface of the phone body includes at least one hole and the first joining surface of the padding block includes at least one latch each disposed corresponding to the hole such that inserting each latch into each corresponding hole will secure the first cutting surface and the first joining surface together.

4. The handheld electronic device of claim 2, wherein the first joining surface of the padding block secured to the first cutting surface of the phone body is done by shaping the padding block for attaching to the first cutting surface of the phone body to form integrally with the phone body as part of the corner of the phone body.

5. The handheld electronic device of claim 3, wherein the first joining surface of the padding block secured to the first cutting surface of the phone body is done by shaping the padding block for attaching to the first cutting surface of the phone body to form integrally with the phone body as part of the corner of the phone body.

6. The handheld electronic device of claim 4, wherein each padding block is made of rubber, silicone rubber, or fabric.

7. The handheld electronic device of claim 5, wherein each padding block is made of rubber, silicone rubber, or fabric.

8. A handheld electronic device with a shockproof mechanism to prevent the handheld electronic device from being damaged after hitting a hard object, the handheld electronic device comprising:

a phone body including an LCD display screen and a keypad disposed on a front surface thereof, and at least one second cutting surface formed at a side edge joining the front surface of the phone body and either side surface thereof as a recess of triangular section; and at least one padding block made of shockproof material and each having a second joining surface adapted to matingly fit onto the second cutting surface.

9. The handheld electronic device of claim 8, wherein each of the second cutting surface and the second joining surface is applied with adhesive thereon such that attaching the adhesive of the second cutting surface to that of the second joining surface will secure the second cutting surface and the second joining surface together.

10. The handheld electronic device of claim 9, wherein the second cutting surface of the phone body includes at least one hole and the second joining surface of the padding block includes at least one latch each disposed corresponding to the hole such that inserting each latch into each corresponding the hole will secure the second cutting surface and the second joining surface together.

11. The handheld electronic device of claim 9, wherein the second joining surface of the padding block secured to the second cutting surface of the phone body is done by shaping the padding block for attaching to the second cutting surface of the phone body to form integrally together with the phone body as part of the side edge of the phone body.

12. The handheld electronic device of claim 10, wherein the second joining surface of the padding block secured to the second cutting surface of the phone body is done by shaping the padding block for attaching to the second cutting surface of the phone body to form integrally together with the phone body as part of the side edge of the phone body.

13. The handheld electronic device of claim 11, wherein each padding block is made of rubber, silicone rubber, or fabric.

14. The handheld electronic device of claim 12, wherein each padding block is made of rubber, silicone rubber, or fabric.

* * * * *